United States Patent [19]

Kawachi et al.

[11] Patent Number: 5,301,176
[45] Date of Patent: Apr. 5, 1994

[54] APPARATUS FOR CARRYING OUT RECORDING AND/OR REPRODUCING SIGNALS FOR DISK-SHAPED RECORDING MEDIUM

[75] Inventors: Hideo Kawachi, Tokyo; Katsuichi Sakurai; Toshiyuki Arai, both of Kanagawa, all of Japan

[73] Assignee: Sony Corporation, Tokyo, Japan

[21] Appl. No.: 895,603

[22] Filed: Jun. 8, 1992

[30] Foreign Application Priority Data

Jun. 10, 1991 [JP] Japan ................... 3-137407

[51] Int. Cl.$^5$ .............................................. G11B 33/02
[52] U.S. Cl. .................... 369/75.2; 369/77.2; 360/98.04
[58] Field of Search ............ 360/99.06, 98.06, 98.04; 369/75.2, 77.2, 77.1

[56] References Cited

U.S. PATENT DOCUMENTS

| | | | |
|---|---|---|---|
| 4,703,367 | 10/1987 | Kosaka et al. | 358/339 |
| 4,853,924 | 8/1989 | Takahashi et al. | 369/270 A |
| 5,150,340 | 9/1992 | Miura et al. | 369/75.12 X |
| 5,172,361 | 12/1992 | Urushibata et al. | 369/77.1 |
| 5,187,700 | 2/1993 | Yoon | 360/99.06 X |

FOREIGN PATENT DOCUMENTS

| | | |
|---|---|---|
| 0368242A2 | 5/1990 | European Pat. Off. |
| 0400949A2 | 12/1990 | European Pat. Off. |
| 0436877A2 | 7/1991 | European Pat. Off. |
| 0005456 | 1/1984 | Japan .................. 369/77.1 |

OTHER PUBLICATIONS

Patent Abstracts of Japan, vol. 11, No. 37 (P-543), 4 Feb. 1987 & JP-A-61 206 962 (Canon), 13 Sep. 1986.
Patent Abstracts of Japan, vol. 11, No. 256 (P-607), 20 Aug. 1987 & JP-A-62 062 473 (Asahi Optical), 19 Mar. 1987.
Patent Abstracts of Japan, vol. 12, No. a 415 (P-781), 4 Nov. 1988 & JP-A-63 152 057 (Pioneer), 24 Jun. 1988.

Primary Examiner—Edward K. Look
Assistant Examiner—Hoang Nguyen
Attorney, Agent, or Firm—Philip M. Shaw, Jr.

[57] ABSTRACT

A disk player for use of playback of both of the single body of a digital optical disk and another digital optical disk encased in a cartridge by a single player. The disk player comprises a disk tray which is mounted on a main chassis and adapted to make its reciprocating movement in the fore-and-aft direction of the player to carry the single body of the disk to a predetermined position in the player. A cartridge carrier is mounted on a sub-chassis connected to and located above the main chassis and makes its reciprocating movement in the fore-and-aft direction to carry the cartridge encasing therein the disk to another predetermined position in the player. A mechanical chassis is tiltably connected to and located below the main chassis and movable upwardly and downwardly. A turntable is rotatably mounted on the mechanical chassis and driven by a motor supported to the mechanical chassis. Either one of the disks carried at the predetermined position is mounted on the turntable to be played back. An optical pickup is movably mounted on the mechanical chassis to pick a digital optical signal from the surface of the disk on the turntable.

14 Claims, 8 Drawing Sheets

APPARATUS FOR CARRYING OUT RECORDING AND/OR REPRODUCING SIGNALS FOR DISK-SHAPED RECORDING MEDIUM

BACKGROUND OF THE INVENTION

1. Field of the Invention

This invention relates generally to improvements in an apparatus for carrying out recording signals in and-/or reproducing signals from a disk-shaped recording medium both in a naked state and an encased state in a cartridge, and more particularly to a disk player which is enabled to make playback or the like of a digital optical disk such as a CD (Compact Disc) which is both at the naked state and the encased state in the cartridge with only one player.

2. Description of the Prior Art

A variety of disk players for making playback or the like of digital optical disks such as a CD (Compact Disc) have been proposed and put into practical use, in which a disk player is used for playback of only the single (naked) body of the disc while a separate disk player is used for playback of only the disc encased in a cartridge. Therefore, in order to make playback of both the single body of the disk and the disk encased in a cartridge, two kinds of disk players are separately necessary to be used, so that cost for the players increases while requiring a larger installation space for them. Additionally, although it is possible to encasing the single body of the disk in the cartridge and use it in the disk player for the disk encased in the cartridge, the disk is required to be encased in or taken out from the cartridge at every playback thereby degrading the operationability of the player.

SUMMARY OF THE INVENTION

It is an object of the present invention to provide an improved apparatus for making recording and/or reproducing operations for both a naked disk and a disk encased in a cartridge, which can overcome drawbacks encountered in conventional similar apparatus, which the recording and/or reproducing operations for two kinds of disks can be accomplished with only one apparatus.

Another object of the present invention is to provide an improved apparatus for making recording and/or reproducing operation for both a naked disk and a disk encased in a cartridge, which is simple in construction and small-sized, while accomplishing the recording and reproduction operations with only simple operation.

A further object of the present invention is to provide an improved apparatus for making recording and/or reproducing operations for both a naked disk and a disk encased in a cartridge, which is low in production cost and in cost for making the recording and/or reproducing operations, while saving a space for installation of the apparatus.

An apparatus of the present invention is for carrying out at least one of recording signals in and reproducing signals from one of both a naked disk and a disk encased in a cartridge, the disk being a disk-shaped recording medium. The apparatus is comprised of a disk tray adapted to receive the naked disk at its first position and to carry the naked disk to its second position at which loading of the naked disk is completed. A cartridge carrier is provided and adapted to receive the cartridge at its first position and carry the cartridge to its second position at which loading of the cartridge is completed, the second position of the cartridge carrier corresponding to the second position of the naked disk. A chucking device is provided to chuck the naked disk at the second position, the chucking means selectively taking first and second states, the naked disk being chucked by the chucking device at the first state. A turntable is provided and adapted to drive one of the naked disk at the second position and the disk in the cartridge at the position. Additionally, a controlling device is provided to control the chucking device to selectively take the first and second states, in relation to a movement of the disk tray.

With the above apparatus, in case of making the recording operation and playback for the single (naked) body of the disk, the disk is carried by the disk tray and loaded to a predetermined position in a casing of the apparatus. In case of making the recording and playback for the disk encased in the cartridge, the cartridge is carried by the cartridge carrier and loaded to a predetermined position in the casing of the apparatus. Thus, with only one apparatus, the recording operation and playback can be carrier out for both of the single body of the disk and the disk encased in the cartridge. Thus, two apparatus in exclusive use for the both discs are unnecessary to be prepared in above both cases, and therefore an installation space for the apparatus can be reduced while lowering cost for the recording operation and playback as compared with conventional similar apparatus. In addition, since such troublesome operations as encasing the disk in and taking out the disk from the cartridge are not required, the above-mentioned two kinds of disks can undergo its recording operation and playback with a merely simple operation.

DETAILED DESCRIPTION OF THE INVENTION

Figure 1:
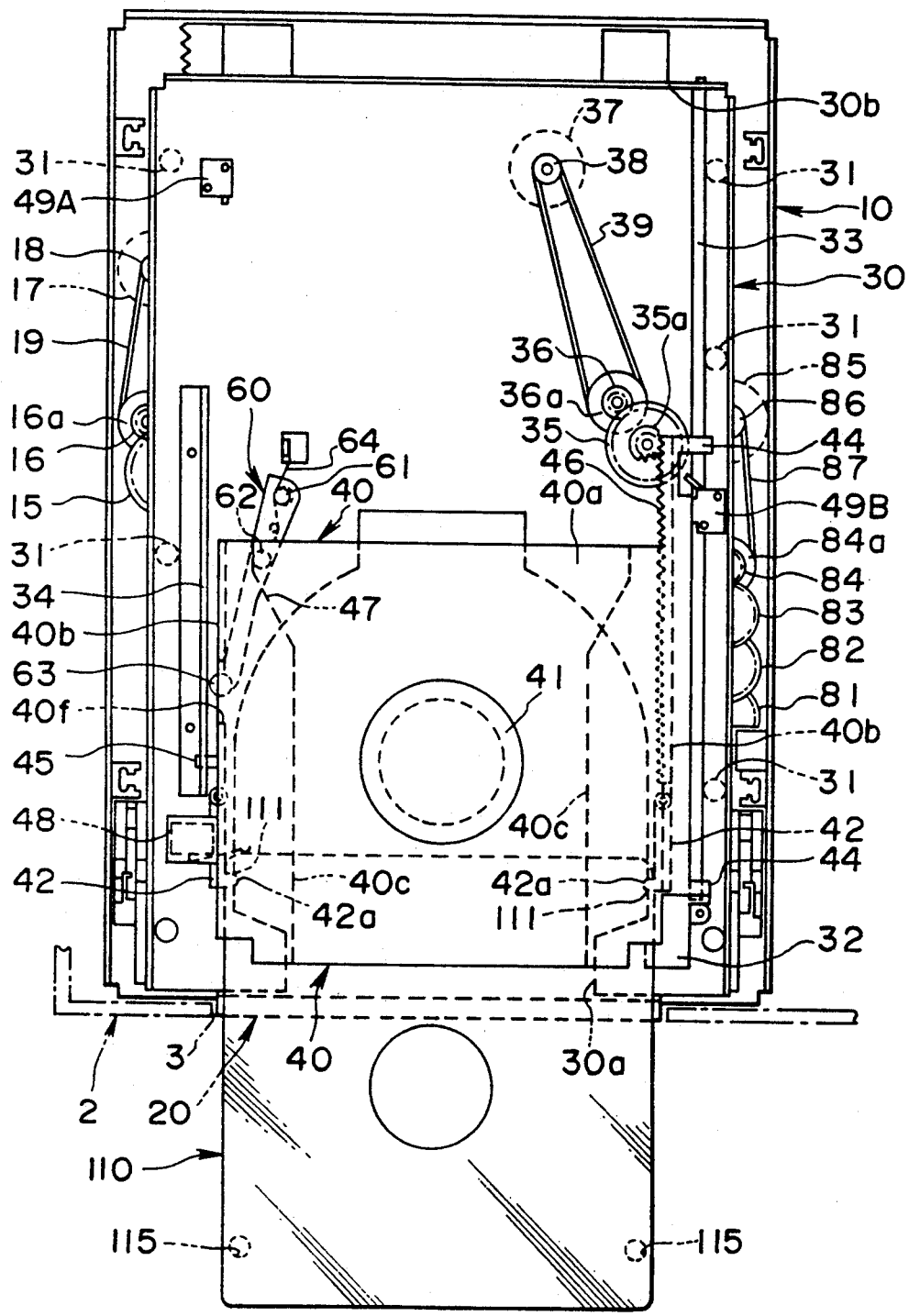
FIG. 1 is a plan view of an inside mechanism of a preferred embodiment of a disk player in accordance with the present invention, as viewed from a cartridge carrier side.

Referring now to FIGS. 1 to 11, and more specifically to FIGS. 1 to 4, there is shown a preferred embodiment of an apparatus 1 for carrying out recording signals in and/or reproducing signals from a disk-shaped recording medium at a naked state or an encased state in which the recording medium is encased in a cartridge, in accordance with the present invention. The apparatus 1 in this embodiment is a digital optical disk player and constructed and arranged to be exclusively used for playback of both the single body of a digital optical disk 100 (naked disk or disk itself) such as a so-called CD (Compact Disc) and another digital optical disk 101 encased in a cartridge 110. It will be understood that digital signals are stored in the disks 100, 110, and they are reproduced when the disk player 1 is suitably operated. The disk player 1 includes a player body or casing 2 which is box-shaped and is provided thereinside a main chassis 10 of the rectangular shape in plan which chassis is located at an intermediate stage of the player body 2. Additionally, a sub-chassis 30 is fixed to and located above the main chassis 10 through a plurality of support posts 31 in such a manner as to be separate a predetermined distance from the upper surface of the main chassis 10. In addition, the main chassis 10 is provided with a pair of brackets 11, 11 which project downwardly from the lower surface at the rear side of the main chassis 10. A mechanical chassis 50 is provided in such a manner as to be upwardly and downwardly movable at its front or free end side relative to the lower surface of the main chassis 10, in which the base end section of the mechanical chassis 50 is located between and pivotally supported through a support shaft 51 to the brackets 11, 11 so as to be rotatably movable in an upward and downward direction of the disk player 1.

Figure 2:
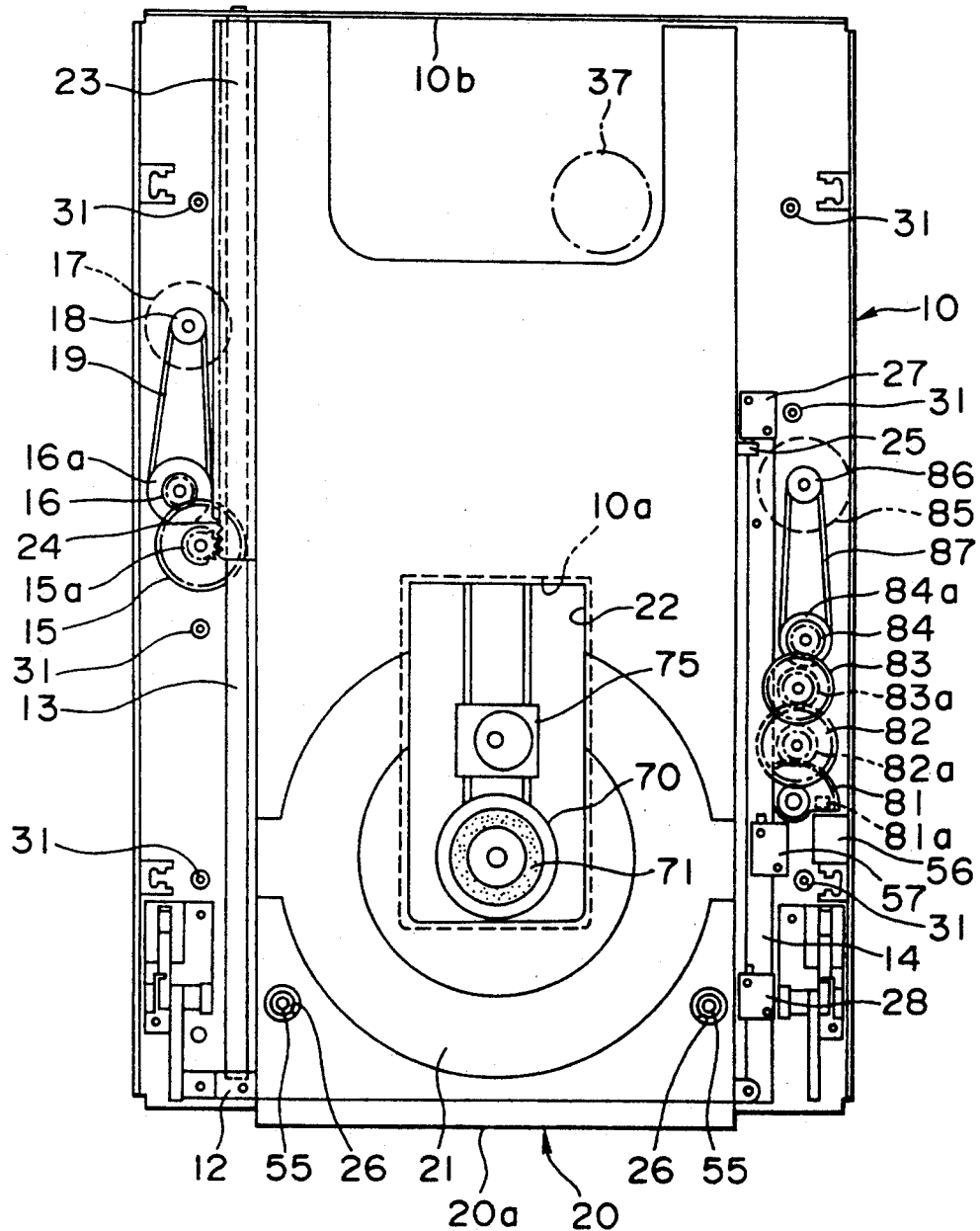
FIG. 2 is a plan view of the inside mechanism of the disk player of FIG. 1 but as viewed from a disk tray side.

As shown in FIG. 2, a disk tray 20 is disposed on the main chassis 10 so as to be reciprocally movable in the fore-and-aft direction of the player body 2. The disk tray 20 functions such that the single body of the disk 100 is mounted thereon and loaded to a position below a rectangular opening 10a formed at the front side of the main chassis 10 in the player body 2. More specifically, the disk tray 20 is formed of a plastic and generally in the shape of a rectangular plate elongating along the longitudinal direction of the player body 2. The disk tray 20 is formed at the front side center of its upper surface with a generally circularly recessed disk mounting surface 21 which is slightly smaller in diameter than the single body of the disk 100. A rectangular opening 22 is formed to extend from the central section to the rear section of the disk mounting surface 21. Additionally, the disk tray 20 is fixedly provided at its right side face with an elongate projection 23 extending in a range from the central rear section to the rear end section thereof. The disk tray 20 is further integrally formed at its left side face with a projection 25 which is C-shaped in cross-section and located near the central rear section thereof. The left side projection 23 of the disk tray 20 is slidably movably mounted around a guide shaft 13 in such a manner that the guide shaft 13 pierces the projection 23. The guide shaft 13 extends from the rear side raised portion 10b of the main chassis 10 and a bracket 12 fixed to the front left side of the main chassis 10. The projection 25 at the right side is slidably fitted to the projecting portion 14a of an elongate guide plate 14 which is fixed on the main chassis 10 at the right side, in which the guide plate 14 has a face which is formed projected and faces the projection 25 thereby to form the projecting portion 14a.

A rack 24 is integrally formed on the outside surface of the projection 23 of the disk tray 20. The rack 24 is meshed with a small diameter gear 15a which is formed integral with and located below a large diameter gear 15 rotatably mounted through a shaft on the main chassis 10 at the left side. The gears 15a, 15 are arranged coaxial with each other. The large diameter gear 15 is meshed with an intermediate gear 16 which is rotatably mounted through a shaft on the main chassis 10 at the left side. A pulley 16a is formed integral with and located below the intermediate gear 16 in such a manner that the pulleys 16a and the gear 16 are arranged coaxial with each other. An annular belt 19 is passed on and extended between the pulley 16a and a drive pulley 18 which is exposed on the main chassis 10 and rotated by a motor 17 for the disk tray driving purpose which motor is fixedly secured on the lower surface of the main chassis 10 at the left side.

Under driving of the motor 17, the disk tray 20 makes its reciprocating slide-movement in the fore-and-aft direction along the guide shaft 13 and the guide plate 14 on the main chassis 10. The single body of the disk 100 is loaded into the player body 2 upon a going slide-movement (or a loading action) of the disk tray 20, while it is ejected from the player body 2 upon a returning slide-movement (or an unloading action) of the disk tray 20. The unloading action of the disk tray 20 allows the disk mounting surface 21 to be exposed outside an opening 3 of the player body 2 so that the single body of the disk 100 can easily put on or removed from the disk mounting surface 21. In FIG. 2, the reference numerals 27, 28 designate switches which respectively detect the completed states of the loading and unloading actions of the disk tray 20 thereby carrying out a changeover operation between driving and stopping modes of the motor 17.

Figure 3:
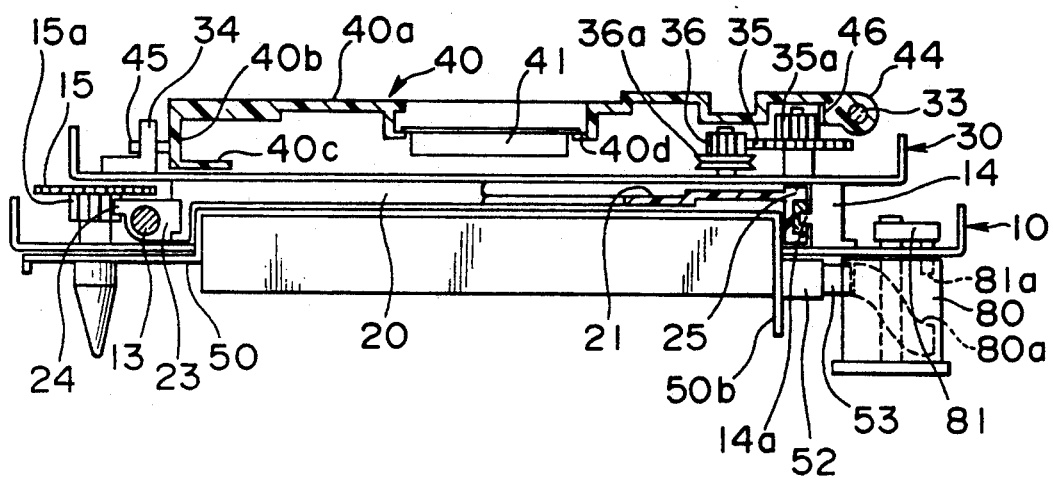
FIG. 3 is a front view, partly in section, of the inside mechanism of the disk player of FIG. 1.

As shown in FIG. 1, a cartridge carrier 40 is disposed on the sub-chassis 30 in a manner to be reciprocatingly movable in the fore-and-aft direction of the disk player 1. The cartridge carrier 40 serves as a cartridge carrying member for grasping the cartridge 110 encasing therein the disk 101 and loading the cartridge 110 into the position below the opening 10a of the main chassis 10. More specifically, the cartridge carrier 40 is formed of a plastic and generally C-shaped as viewed from a frontal direction and includes a generally horizontally extending upper wall section 40a which is located above the upper surface of the sub-chassis 30. Generally vertically extending opposite side wall sections 40b, 40b are integral with the upper wall section 40a at the opposite side sections. Additionally, generally horizontally extending opposite bottom wall sections 40c, 40c are respectively integral with and project from the lower parts of the opposite side wall sections 40b, 40b. As best shown in FIG. 3, the cartridge carrier 40 is integrally formed at its upper wall section 40a with an annular flange section 40d which is located depressed below the upper surface of the upper wall section 40a.

A chucking member 41 is located inside and loosely fitted with the annular flange section 40d to be vertically movable in order to clamp the single body of the disk 100 between it and a turntable 70 which will be discussed after. A pair of nails 42, 42 are horizontally rotatably mounted through pins on the cartridge carrier 40 respectively at the front sides of the opposite side sections 40b, 40b, under the biases of the respective helical torsion springs 43. The nails 42, 42 are adapted to engage with and disengage from respective engaging grooves 111, 111 formed at the front side of the opposite side faces of the cartridge 110. The nails 42, 42 are such arranged that their tip ends 42a project through small holes 40e of the respective side wall sections 40b of the cartridge carrier 40 so as to be exposed inside the side wall sections 40b, so that the nails 42, 42 are respectively inserted in the engaging grooves 111, 111 at the front side of the cartridge 110 thereby grasping the cartridge 110 at the opposite sides, inserted to the front side of the cartridge carrier 40 and mounted on the opposite bottom wall sections 40c, 40c of the cartridge carrier 40.

The right side side wall section 40b of the cartridge carrier 40 is integrally formed at its outer surface with a pair of projections 44, 44 which project outwardly. The left side side wall section 40b of the cartridge carrier 44 is integrally formed at its outer surface central portion with a projection 45 which projects outwardly. The projections 44, 44 of the cartridge carrier 40 are slidably movably mounted on a guide shaft 33 in such a manner that the guide shaft 33 passes through the projections 44, 44. The guide shaft 33 is disposed to extend from a rear side raised portion 30b of the sub-chassis 30 and a bracket 32 which is fixed to the front right side of the sub-chassis 30. The projection 45 is slidably fitted in a guide groove 34a formed at the central portion of and along the length of an elongate guide plate 34 which is fixed on the sub-chassis 30 at the left side.

Furthermore, a rack 46 is formed integral with the right side side wall section 40b of the cartridge carrier 40 at the inner side surface. The rack 46 is meshed with a small diameter gear 35a which is formed integral with and located above a larger diameter gear 35 rotatably supported through a shaft on the sub-chassis 30 at the right side. The gears 35a, 35 are coaxial with each other. The large diameter gear 35 is meshed with an intermediate gear 36 which is rotatably supported through a shaft on the sub-chassis 30 at the right side. The intermediate gear 36 is integrally formed with a pulley 36a which is located below the intermediate gear 36. The intermediate gear 36 and the pulley 36a are coaxial with each other. An annular belt 39 is passed on and extended between the pulley 36a and a driving pulley 38 which is exposed on the sub-chassis 30 and rotated by a motor 37 for the cartridge carrier driving purpose, fixedly secured on the sub-chassis 30 at the lower surface.

Figure 11:
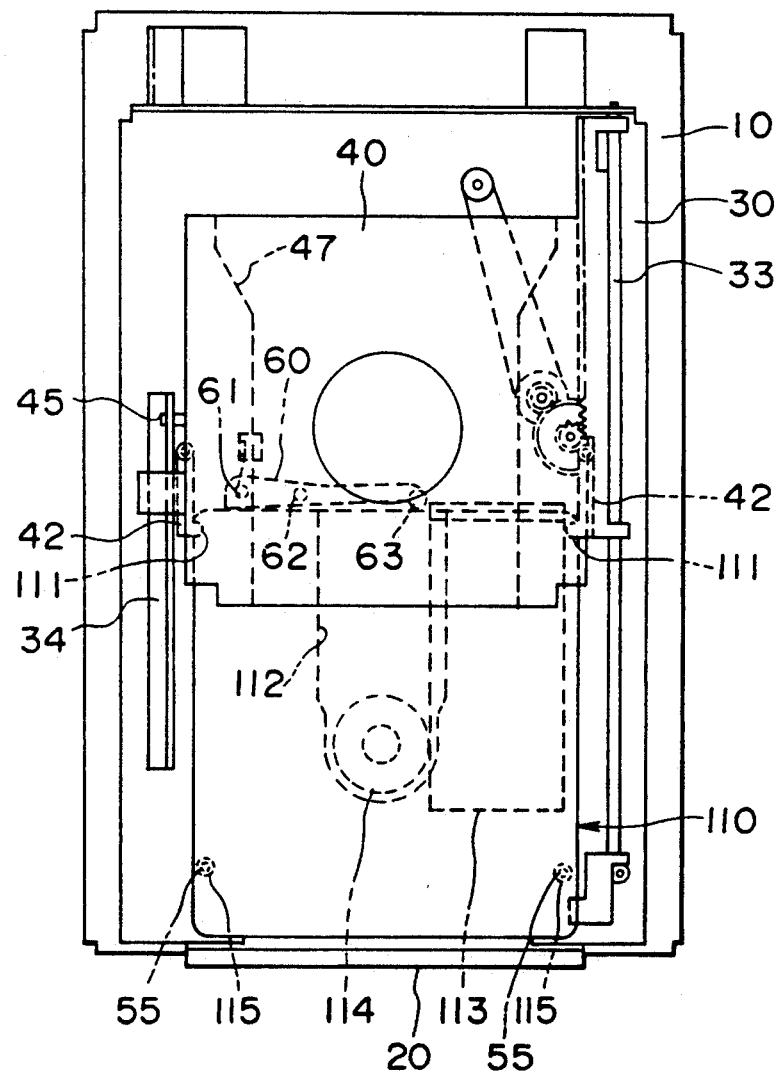
FIG. 11 is a schematic plan view similar to FIG. 10 but showing an operational state of the shutter opening-closing lever at a time the opening action of the shutter is completed.

Under driving of the motor 37, the cartridge carrier 40 is adapted to make its reciprocating slide-movement in the fore-and-aft direction and along the guide shaft 33 and the guide plate 34 on the sub-chassis 30. The cartridge 110 encasing therein the disk 101 is loaded into the player body 2 upon a going slide-movement (or the loading action) of the cartridge carrier 40, while it is ejected from the player body 2 upon a returning slide-movement (or the unloading action) of the cartridge 110. As shown in FIG. 1, the front face of the cartridge carrier 40 is adapted to be brought into contact with the bracket 32 on the sub-chassis 30 at the time of completion of the unloading action of the cartridge carrier 40, and therefore the cartridge carrier 40 is prevented from getting out of the player body 2 through the opening 3. Additionally, as shown in FIG. 11, the cartridge 110 is adapted to be carried by the cartridge carrier 40 and located on the rear section of the sub-chassis 30 at the time of completion of the loading action of the cartridge carrier 40.

Turning back to FIG. 1, the sub-chassis 30 is formed at its front side with a front opening 30a having a generally U-shaped profile which opening is located corresponding to the opening 10a of the main chassis 10. In FIG. 1, the reference numeral 48 designates a switch which is adapted to drive the motor 37 at the time the cartridge 110 is grasped at its engaging grooves 111, 111 by the rails 42, 42 of the cartridge carrier 40. The reference numerals 49A, 49B designate switches which respectively detect the completed states of the loading and unloading actions of the cartridge carrier 40 thereby carrying out a changeover operation of driving and stopping of the motor 37.

Figure 5:
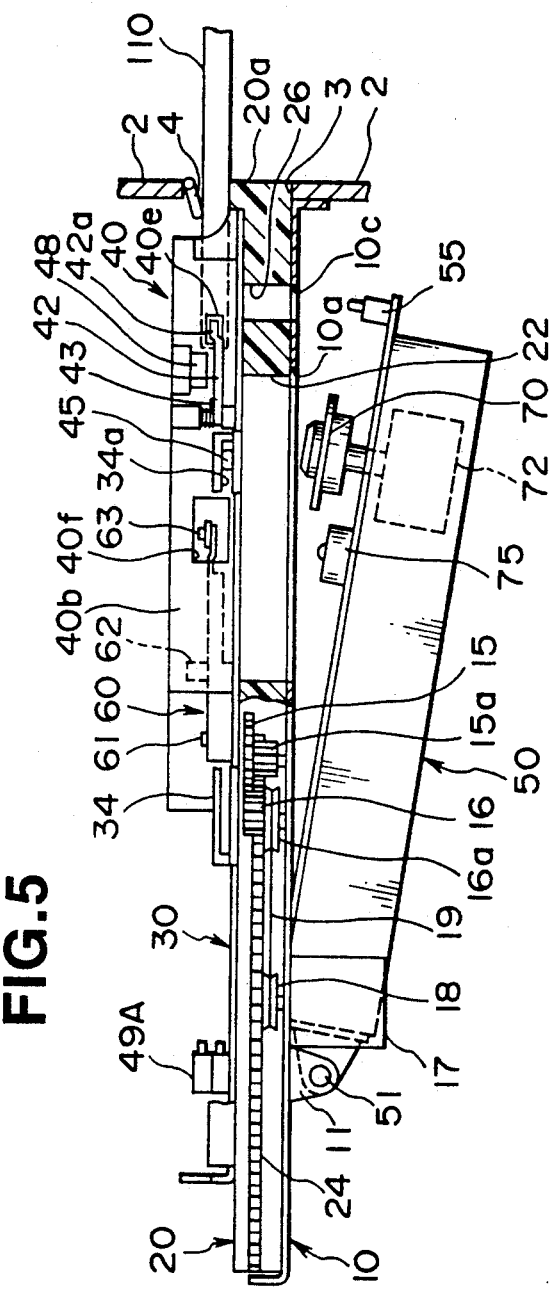
FIG. 5 is a left side view, partly in section, of the inside mechanism of the disk player of FIG. 1, showing an operational state in which a cartridge is inserted in the disk player.
Figure 6:
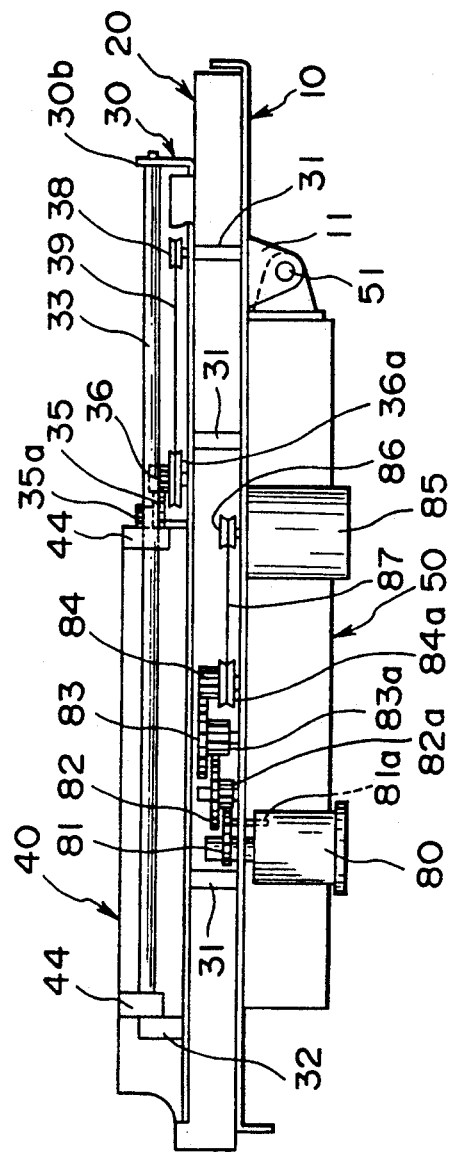
FIG. 6 is a right side view of the inside mechanism of the disk player.

As shown in FIG. 1, a shutter opening-closing lever 60 is rotatably supported at its base section to the left side central part of the sub-chassis 30 through a support shaft 61. As shown in FIGS. 1 and 5, a roller 62 as a cam follower is rotatably supported at the upper surface central part of the shutter opening-closing lever 60. A pin 63 is projected from the tip end section of the shutter opening-closing lever 60, and adapted to engage with and disengage from a shutter 113 thereby to opening and closing the shutter 113. The shutter 113 is adapted to open and close an opening 112 formed at the bottom surface of the cartridge 110. The shutter opening-closing lever 60 is biased by a helical torsion spring 64 such that the pin 63 at its tip end section is located at a rectangular small opening 40f in the side wall section 40b of the cartridge carrier 40. The roller 62 of the shutter opening-closing lever 60 is adapted to be rotatable upon slidingly contacting with a tapered surface 47 as a cam surface formed at the rear part of the bottom wall section 40c of the side wall section 40b. Accordingly, the shutter opening-closing lever 60 is adapted to rotate in operative relation to the loading and unloading actions of the cartridge carrier 40 thereby to open and close the shutter 113 of the cartridge 110. The shutter 113 for opening and closing the opening 112 formed at the bottom surface of the cartridge 110 is adapted to close the opening 112 under the bias of a spring (not shown) housed in the cartridge 110 when the biasing force of the pin 63 of the shutter opening-closing lever 60 is released.

As seen in FIG. 5, the mechanical chassis 50 is fixedly provided with a spindle motor 72 for rotatably supporting the turntable 70, located at a position corresponding to the opening 10a of the main chassis 10. An optical pickup 75 for playback of each of disks 100, 101 is disposed at the central part of the opening 10a of the main chassis 10 to be reciprocatingly movable in a radial direction of each of the disks 100, 101 under the action of a driving mechanism (not shown). As shown in FIG. 3, the mechanical chassis 50 is provided with a pin 52 which projects from the front side outer surface of a right side wall section 50b of the mechanical chassis 50. A roller 53 is rotatably supported to the pin 52. The roller 53 is loosely fitted in a helical cam groove 80a formed on a cylindrical cam 80 which is rotatably supported to the main chassis 10 at the lower surface of the right front side. The cam 80 is supported on a shaft on which a sector gear 81 is supported so that they are coaxial with each other. The sector gear 81 is rotatably supported at the right side of the upper surface of the main chassis 10 and is integrally formed with an engaging section 81a which projects from the lower section of the sector gear 81. The cam 80 is engaged with the engaging section 81a so as to be rotationally movable within a range of an angle of about 90 degrees, in relation to the sector gear 81.

Turning back to FIG. 2, the sector gear 81 is meshed with a small diameter gear 82a which is formed integral with and located below a first intermediate gear 82. The gears 82a, 82 are coaxial with each other. The first intermediate gear 82 is meshed with a small diameter gear 83a which is formed integral with and located below a second intermediate gear 83. The second intermediate gear 83 is meshed with a third intermediate gear 84 which is rotatably supported on the main chassis 10 at the right side. The third intermediate gear 84 is formed integral with a pulley 84a located below it in such a manner that the gear 84 and the pulley 84a are coaxial with each other. An annular belt 87 is passed on and extended between the pulley 84a and a driving pulley 86 which is exposed on the main chassis 10 and rotated by a motor 85 for the purpose of driving the mechanical chassis to move upwardly and downwardly. The motor 85 is fixedly secured to the right side of the lower surface of the main chassis 10.

Under driving of the motor 85, the mechanical chassis 50 rotationally move in an upward and downward direction of the disk player 1 and around the support shaft 51, so that the front side of the mechanical chassis 50 makes its upward and downward movements. During the upward movement of the front side of the mechanical chassis 50, the turntable 70, the optical pickup 75 and the like are projected above the sub-chassis 30 through the opening 10a of the main chassis 10 and the front opening 30a of the sub-chassis 30. During the downward movement of the front side of the mechanical chassis 50, the turntable 70 and the optical pickup 75 and the like are withdrawn downwardly through the opening 10a of the main chassis 10 and the front opening 30a of the sub-chassis 30 therby to avoid an interference with the loading and unloading actions of the disk tray 20 and the cartridge carrier 40. In FIG. 2, the reference numeral 71 designates an annular magnet fixed on the upper surface of the turntable 70.

Figure 4:
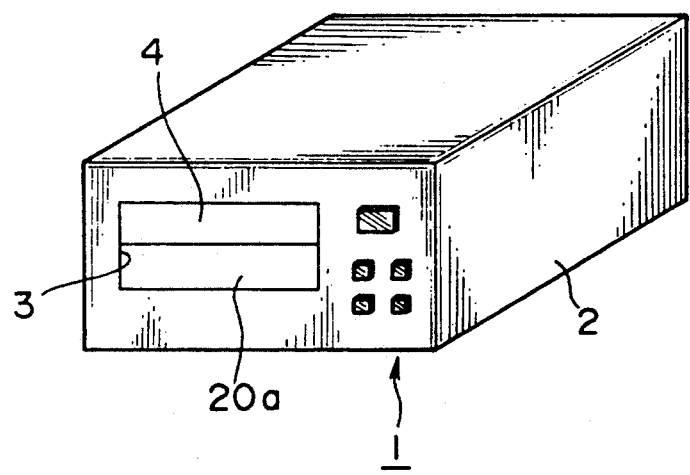
FIG. 4 is a perspective view of the disk player of FIG. 1.

The mechanical chassis 50 is provided with a pair of locationing pins 55, 55 which project upwardly and are located at the opposite sides of the front end sections of the mechanical chassis 50. When the front side of the mechanical chassis 50 moves upwardly, the locationing pins 55, 55 are respectively inserted into a pair of locationing holes 26, 26 formed at the bottom surface of the cartridge 110 through a pair of small holes 10c, 10c of the main chassis 10 and a pair of small holes 26, 26 of the disk tray 20. The thus inserted locationing pins 55, 55 are brought into engagement in the locationing holes 115, 115, so that the locationing of the cartridge 110 is accomplished at the time of completion of the loading of the cartridge 110. In FIG. 2, the reference numerals 56, 57 designate switches which are adapted to be switched ON and OFF by the sector gear 81 thereby to change over the rotation of the driving pulley 86 of the motor 85 in normal and reverse directions. As seen in FIG. 4, the player body 2 of the disk player 1 is formed at its front side surface with a rectangular opening 3, in which a front side surface (right side surface) 20a of the disk tray 20 is exposed at the lower side of the opening 3, while a lid 4 covering the front end side is openably installed at the upper side of the opening 3.

The manner of operation of the above disk player 1 will be discussed hereinafter with reference to FIGS. 5 to 11.

In case of playback of the single body of the disk 100, first an eject button 5 at the front side surface of the player body 2 is pushed to draw the disk tray 20 from the lower side of the opening 3 of the player body 2. Subsequently, the disk 100 is put on the disk mounting surface 21 of the disk tray 20. When the front side surface 20a of the disk tray 20 is pushed or otherwise the eject button 5 is again pushed, the motor 17 for the disk tray driving purpose is driven and therefore the disk 100 is started to be loaded. At this time, as shown in FIG. 5, the turntable 70 and the optical pickup 75 are withdrawn below the lower surface of the main chassis 10, so that the turntable 70 and the like are prevented from coming into contact with the disk tray 20. As shown in FIG. 2, when the disk tray 20 makes its going slide-movement to reach the rear end section of the main chassis 10 so that its projection 25 comes into contact with the switch 27, the motor 17 is stopped and accordingly the center of the disk mounting surface 21 of the disk tray 20 is located above the turntable 70, completing the loading of the disk 100. At this time, the chucking member 41 of the cartridge carrier 40 is located above the turntable 70.

Figure 8:
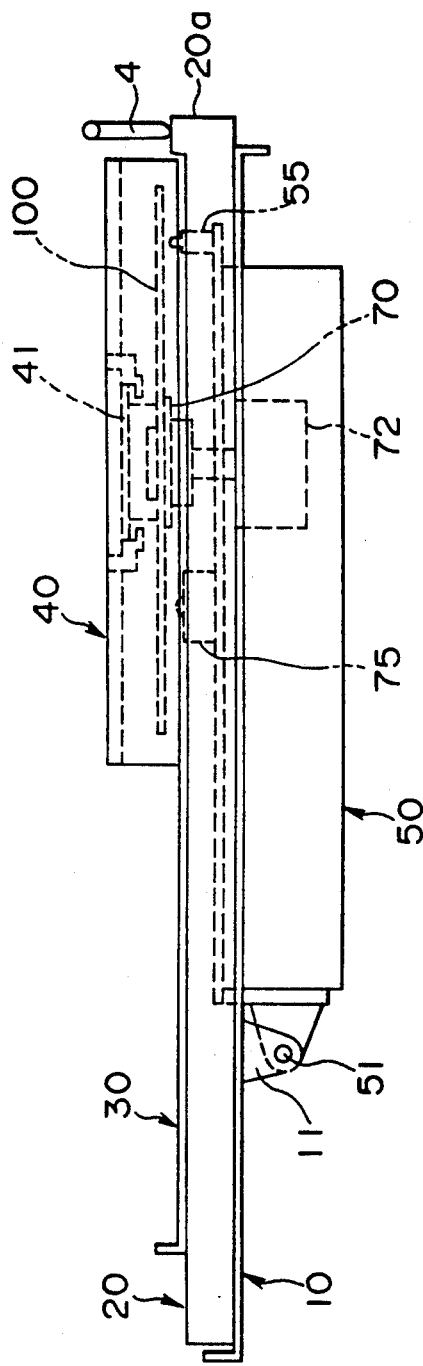
FIG. 8 is a schematic left side view of the inside mechanism of the disk player of FIG. 1, showing an operational state in which a disk is loaded in the disk player.

When the loading of the disk 100 is completed, the motor 85 for the mechanical chassis upwardly and downwardly driving purpose is driven, so that the front side of the mechanical chassis 50 ascends and therefore the turntable 70 and the optical pickup 75 ascend. This ascending of the turntable 70 and the like causes the disk 100 to be mounted on the upper surface of the turntable 70 and to ascend over the front opening 30a of the sub-chassis 30 through the opening 22 of the disk tray 20. Then, the ascended disk 100 is rotatably clamped between the turntable 70 and the chucking member 41 of the cartridge carrier 40 as shown in FIG. 8, so that the playback is made under the action of the optical pickup 75. Ejection of the single body of this disk 100 is carried out under the returning slide-movement (unloading action) of the disk tray 20 which movement is reverse in action to the loading action of the disk tray 20.

Figure 9:
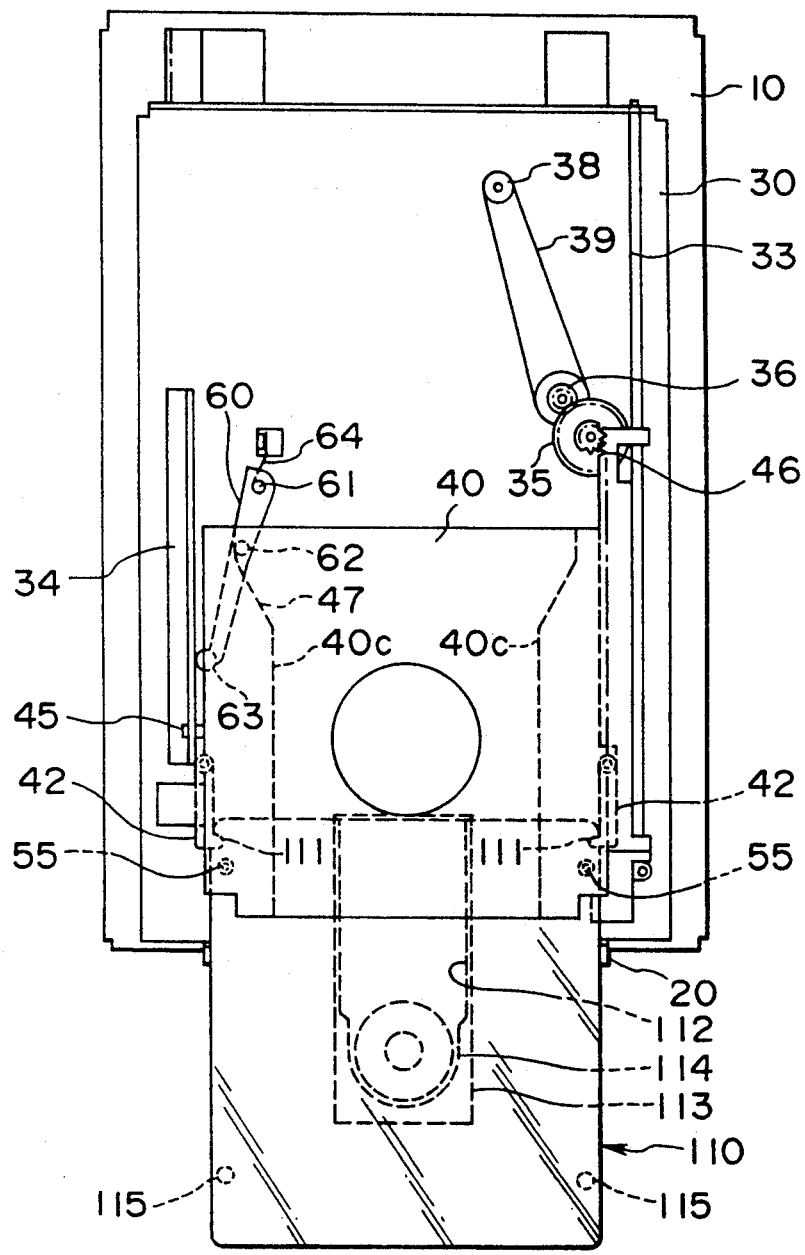
FIG. 9 is a schematic plan view of the inside mechanism of the disk player of FIG. 1, similar to FIG. 1 but showing a movement of a shutter opening-closing lever at a time the cartridge is used.

In case of playback of the disk 101 encased in the cartridge 110 by using the disk player 1 as shown in FIG. 5, the cartridge 110 is inserted to the front side of the cartridge carrier 40 upon pushing the lid 4 of the player body 2 with the tip end of the cartridge 110. Then, the tip ends 42a, 42a of the nails 42, 42 of the cartridge carrier 40 are respectively brought into engagement with the engaging grooves 111, 111 at the opposite sides of the cartridge 110, so that the cartridge 110 is grasped, as shown in FIGS. 1 and 9. When the tip ends 42a, 42a of the nails 42, 42 of the cartridge carrier 40 are respectively brought into engagement with the engaging grooves 111, 111 at the opposite sides of the cartridge 110, the switch 48 is operated to drive the motor 37 for the cartridge carrier driving purpose. This causes the cartridge carrier 40 to make its going slide-movement to the rear end section of the sub-chassis 30, and therefore the cartridge 110 starts to be loaded through the cartridge carrier 40. At this time, as shown in FIG. 5, the turntable 70 and the optical pickup 75 of the mechanical chassis 50 is withdrawn below the lower surface of the main chassis 10, and accordingly the turntable 70 and the like are prevented from contacting with the cartridge carrier 40.

Figure 10:
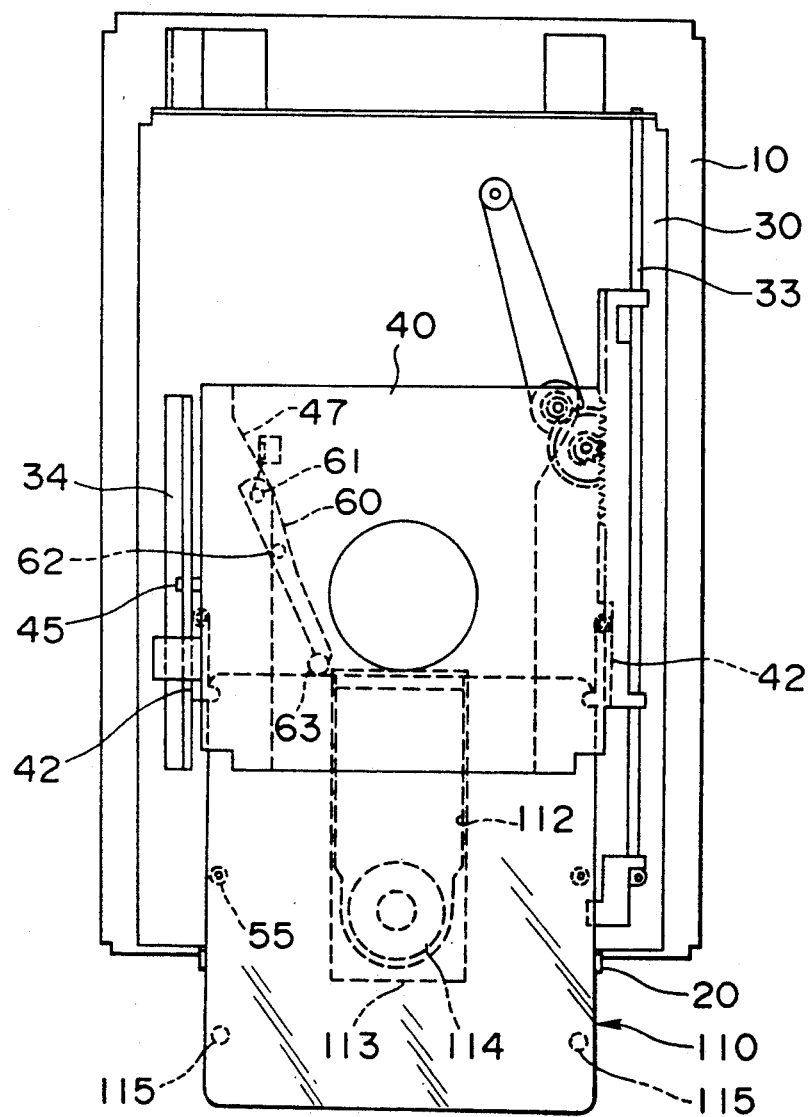
FIG. 10 is a schematic plan view similar to FIG. 9 but showing an operational state of the shutter opening-closing lever in the course of opening action of a shutter of the cartridge.

In operative relation to this loading action of the cartridge carrier 40, the roller 62 of the shutter opening-closing lever 60 rotatably supported through the support shaft 61 on the main chassis 10 is brought into contact with the tapered surface 47 formed at the left side bottom wall section 40c of the cartridge carrier 40 in the course of the loading of the cartridge 110, so that the shutter opening-closing lever 60 gradually rotates counterclockwise as seen from FIGS. 9 and 10. This counterclockwise rotation of the shutter opening-closing lever 60 causes the pin 63 at the tip end thereof to push the left side upper end edge of the shutter 113 of the cartridge 110 so that the shutter 113 starts to gradually open as shown in FIG. 10. When the cartridge carrier 40 makes its going slide-movement to the rear end side of the sub-chassis 30, the shutter 113 of the cartridge 110 is fully opened while the rear end face of the cartridge carrier 40 is brought into contact with the switch 49A as shown in FIG. 11. This causes the motor 37 to stop, in which the disk encased in the cartridge 110 is located above the turntable 70, completing the loading of the cartridge 110.

Figure 7:
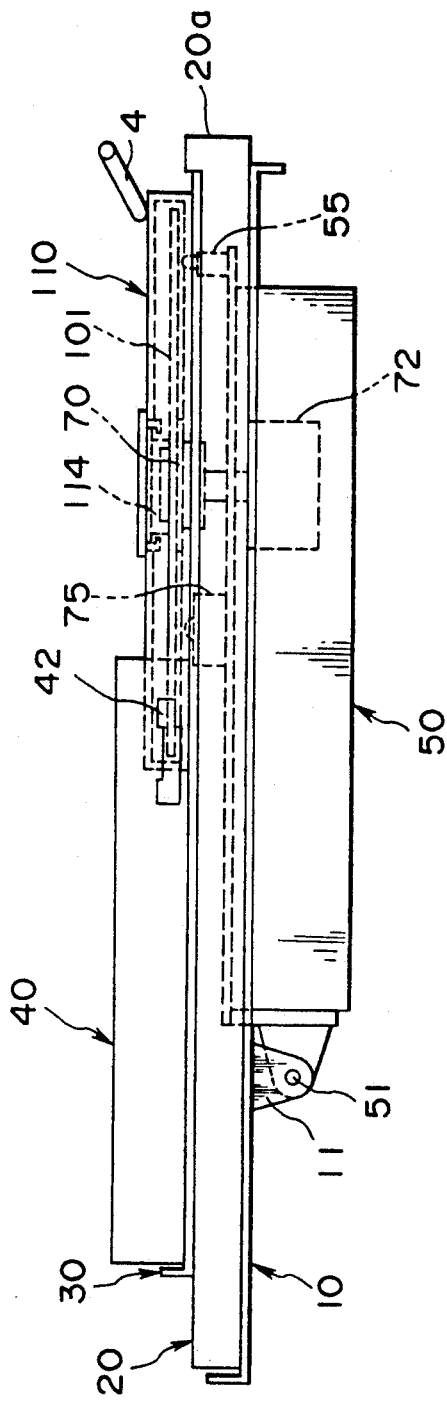
FIG. 7 is a schematic right side view of the inside mechanism of the disk player of FIG. 1, showing an operational state in which the cartridge is loaded in the disk player.

When the loading of the cartridge 110 is completed, the motor 85 for the purpose of upwardly and downwardly driving the mechanical chassis is rotated, so that the front side of the mechanical chassis 50 ascends and therefore the turntable 70 and the optical pickup 75 ascend. This ascending of the turntable 70 and the like causes the disk 101 within the cartridge 110 to be mounted on the upper surface of the turntable 70 and to ascend. Then, the ascended disk 101 is rotatably clamped between the turntable 70 and the chucking member 114 inside cartridge 110 as shown in FIG. 7, so that the playback is made under the action of the optical pickup 75. Ejection of the cartridge 110 is carried out under the returning slide-movement (unloading action) of the cartridge carrier 40 which movement is reverse in action to the loading action of the disk tray 20.

Thus, with the single disk player 1, both the single body of the disk 100 and the disk 101 encased in the cartridge 110 can be respectively played back. Accordingly, it becomes unnecessary to use two disk players for the only playback purpose, and therefore cost for playback becomes low. In addition, conventional troublesome operations for encasing the disk in and taking out the disk from the cartridge have become unnecessary when playback or the like of the disks is made, so that the both disks 100, 101 can be played back respectively by simple operations. In this connection, it would be convenient to encase only a frequently used disk in the cartridge to be used. Furthermore, the disk tray 20 for loading the single body of the disk 100 to a predetermined position inside the player body 2 and the cartridge carrier 40 for loading the cartridge 110 storing the disk 101 to a predetermined position inside the player body 2 are arranged to form a two-stage in a vertical direction through the respective chassis 10, 30. Accordingly, the player body 2 is arranged small-sized without increasing its length. Additionally, both the disks 100, 101 can be respectively played back with only one disk player 1. These save a space as an installation place for the disk player 1.

The cartridge carrier 40 for loading the disk 101 to the predetermined location in the player body 2 serves also to clamp the single body of the disk 100 in cooperation with the chucking member 41 during the playback of the single body of the disk 100. This renders unnecessary, for example, a mechanism and the like for pushing up upwardly the chucking member adapted to clamp the single body of the disk, thereby enabling a mechanism for loading the single body of the disk 100 and the cartridge 110 to be simplified. As a result, the player body 2 can be small-sized while enabling the disk player 1 to be offered at a low cost.

The rotational movement of the shutter opening-closing lever 60 for opening and closing the shutter 113 of the cartridge 110 encased therein the disk 101 is in operative relation to the loading and unloading actions of the cartridge carrier, and therefore it is unnecessary to use a driving source such as a motor for driving the shutter opening-closing lever 60. This reduces the number of component parts thereby enabling the whole disk player 1 to be lowered in cost and small-sized with a weight-lightening.

While only the disk player exclusively used for playback of both the single body of the disk and the disk encased in the cartridge has been shown and described as the preferred embodiment, it will be understood that the principle of the present invention may be applicable to an apparatus (including a disk recorder) to be used for recording operation and/or playback of disks each of which is capable of record signals therein and/or reproduce signals therefrom, such as the single body of a photomagnetic disk and a photomagnetic disk encased in a cartridge.

As discussed above, the disk player or recorder according to the present invention includes the disk tray for loading the single body of the disk to the predetermined position in the player body. The cartridge carrier is provided to load the cartridge to the predetermined position in the player body. The turntable is provided such that either one of the disks loaded at the predetermined position in player body is mounted thereon. Additionally, the optical pickup is provided to make the recording operation and/or the playback for either one of the above-mentioned disks loaded at the predetermined position in the above-mentioned player body. Accordingly, the recording operation and playback can be effectively carried out for both the single body of the disk and the disk encased in the cartridge with only one player, so that two disk players respectively exclusively used for the two kinds of disks are unnecessary to be provided as conventional. As a result, the recording operation and playback for the two kinds of the disks can be accomplished at low cost while saving a space for installation of the disk player. In addition, since troublesome operations of encasing the disk in and taking out the disk from the cartridge become unnecessary, the above-mentioned two kinds of disks can undergo their recording operation and playback with a simple operation.

Furthermore, the shutter of the cartridge is adapted to be openable and closable in operative relation to the loading and unloading actions of the cartridge carrier, and therefore no separate driving source is necessary so that the number of component parts is reduced. As a result, the whole disk player can be further lowered in cost and small-sized. Moreover, since the cartridge carrier is provided with the chucking member for chucking the single body of the disk at the recording operation and playback, the cartridge carrier functions not only to carry the disk but also to chuck the disk. Accordingly, mechanisms such as that for loading the single body of the disk and the cartridge can be simplified in structure, so that the whole disk player can be further more lowered in production cost and small-sized.

What is claimed is:

1. An apparatus for carrying out at least one of recording signals in and reproducing signals from one of both a naked disk and a disk encased in a cartridge, the disk being a disk shaped recording medium, the apparatus comprising:

a disk tray for receiving the naked disk at a first position and to carry the naked disk to a second position at which loading of the naked disk is completed;

a cartridge carrier for receiving the cartridge at a third position and carrying the cartridge to the second position at which loading of the cartridge is completed chucking means for chucking the naked disk at the second position, the chucking means selectively taking a first state and a second state, the naked disk being chucked by the chucking means at the first state;

a turntable for driving one of the naked disk at the second position and the disk in the cartridge at the second position; and means for controlling the chucking means to selectively take the first state and the second state.

2. An apparatus according to claim 1, wherein the controlling means selectively puts the chucking means into the first state in relation to loading of the naked disk at the second position and into the second state in relation to loading of the cartridge at the second position.

3. An apparatus according to claim 2, wherein the chucking means includes a chucking member which contacts with the naked disk at the second position.

4. An apparatus according to claim 3, wherein the chucking member is movably mounted on the cartridge carrier.

5. An apparatus according to claim 3, further comprising means for slidably moving the chucking member together with the cartridge carrier so that the chucking member is movable between two positions which correspond respectively to the first state and the second state of the chucking means.

6. An apparatus according to claim 5, wherein the cartridge carrier includes a holding device for holding the cartridge at the third position, when actuated.

7. An apparatus according to claim 6, further comprising a casing encasing therein the disk tray, the cartridge carrier, the chucking means, the turntable and the controlling means, wherein at least a part of the cartridge is inserted into the casing when the cartridge is at the third position.

8. An apparatus according to claim 7, wherein the controlling means includes first detecting means for detecting the actuation of the holding device, second detecting means for detecting the completion of loading of the cartridge at the first position, and a motor for moving the cartridge carrier together with the chucking member, when driven, the motor being driven in response to the detection of the first detecting means and the second detecting means.

9. An apparatus according to claim 1, further comprising a shutter opening-closing lever pivotally movably mounted on a stationary member and selectively movable between one position to open a shutter of the cartridge and another position to close the shutter, at least a part of the disk being exposed when the shutter is opened, and means for controlling the shutter opening-closing lever to selectively take the one position or the another position in relation to movement of the cartridge carrier.

10. An apparatus according to claim 9, wherein the shutter opening-closing lever has a cam follower which is movably associated with a cam surface formed on the cartridge carrier.

11. An apparatus according to claim 1, wherein the disk tray is slidably movable in a first direction to carry the naked disk from the first position to the second position, and the cartridge carrier is slidably movable in a second direction to carry the cartridge from the third position to the second position, the first direction and the second direction being horizontal and parallel with each other.

12. An apparatus according to claim 7, further comprising a first chassis encased in the casing, and wherein the disk tray is slidably movably mounted on the first chassis, a second chassis encasing in the casing and connected to the first chassis, the second chassis being disposed vertically spaced from the first chassis to form a two-stage chassis structure, the cartridge carrier being slidably movably mounted on the second chassis.

13. An apparatus according to claim 12, wherein the first chassis is located below the second chassis.

14. An apparatus according to claim 13, further comprising a third chassis which is pivotally connected to the first chassis to be tiltable relative to the first chassis in relation to a movement of the disk tray and of the cartridge carrier, the turntable being rotatably mounted on the third chassis.

* * * * *